O. W. WREN.
CULINARY STEAMER.

No. 188,036. Patented March 6, 1877.

WITNESSES
E. H. Bates.
H. Clay Smith.

INVENTOR
Oliver W. Wren.

ATTORNEY

UNITED STATES PATENT OFFICE.

OLIVER W. WREN, OF BROOKLYN, NEW YORK.

IMPROVEMENT IN CULINARY STEAMERS.

Specification forming part of Letters Patent No. 188,036, dated March 6, 1877; application filed February 15, 1877.

*To all whom it may concern:*

Be it known that I, OLIVER W. WREN, of Brooklyn, in the county of Kings and State of New York, have invented certain new and useful Improvements in Culinary Steamers; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The object of my invention is to present a compact portable culinary steamer, adapted to be used on a stove or other heating apparatus for the purpose of subjecting the different edibles to the action of heat therein.

My invention consists in a semicircular body, the flat side furnishing bearings for a hinged door. The lower portion serves as a reservoir for water, from which steam is generated. The inner surface of the vessel, at proper distances, is provided with cleats or other suitable devices to hold the perforated shelves. These shelves are of form corresponding to a horizontal section through the vessel, and are adapted to allow the steam to pass through the perforations and around the articles which are held thereon.

A vent at the top of the vessel allows the escape of steam, and is provided with a screw-cap, or other suitable device, by means of which the amount of outflow of steam may be regulated, and the degree of heat be consequently governed. The hinged door allows easy access to the inner part of the vessel, and it is provided with suitable means for fastening when closed.

Figure 1:
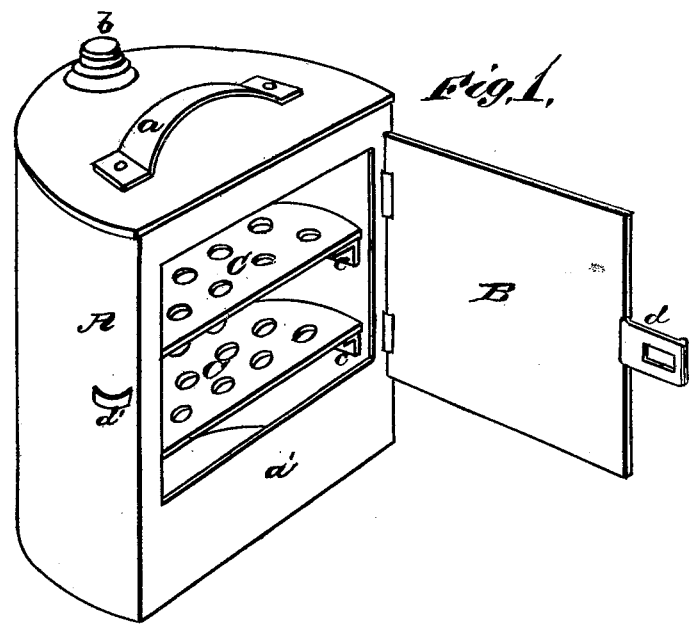
Figure 2:
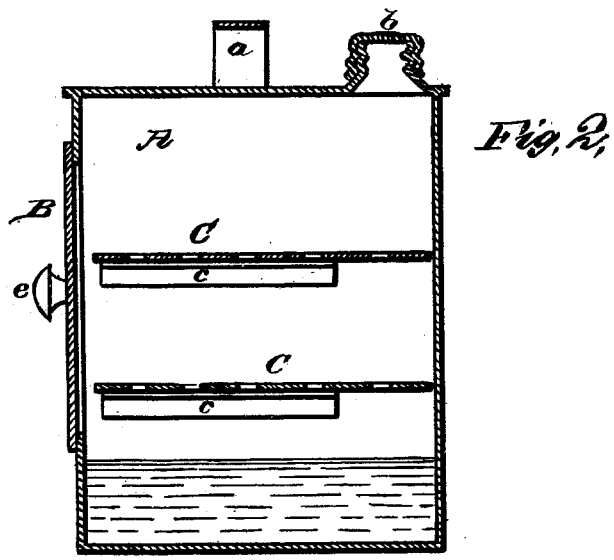

In the accompanying drawings, which form a part of this specification, Figure 1 is a perspective view of my improved culinary steamer, and Fig. 2 a vertical section of the same.

A represents the body of the vessel, and $a$ the handle. The vessel is semi-cylindrical in form, is made of suitable metal, with water-tight bottom, and has a flat side, $a'$, which furnishes bearings for the hinged door B. $b$ is the vent in the top of the vessel, which constitutes an outlet for the steam. It is governed by a screw-cap or stop-cock, by means of which the amount of outflowing steam, and the degree of heat within the vessel, may be regulated.

C C represent perforated shelves, of form to correspond with the inner surface of the vessel, and $c$ the cleats upon the inner sides of the vessel, which serve to support the said shelves. As many of these shelves and cleats may be used as may be desired. The shelves are readily removable through the hinged door. $d\ d'$ represent the device for securing the door in a closed position. The lower portion of the vessel is adapted to hold water, from which is generated the steam. To economize the space on a stove and allow other articles to be placed thereon, I form the vessel of semi-cylindrical form, and this I deem an important feature of my invention.

I am aware that devices of this class have before been used for the same purpose; that a vessel adapted to hold water and generate steam, and that open shelves, and dishes, and the like, are old; and such, broadly, I do not claim; but what I do claim is—

The semi-cylindrical flat-bottomed vessel A $h\ a'$ provided with a vent, $b$, controlled as specified, and with cleats $c$ and door B, and adapted to serve in connection with the perforated semicircular shelves C, as and for the purpose described.

In testimony that I claim the foregoing as my own I affix my signature in presence of two witnesses.

OLIVER W. WREN.

Witnesses:
H. CLAY SMITH,
J. C. LATHROP.